July 26, 1966  C. W. GEER  3,263,101

PHOTO-CATHODE SOLAR-ENERGY CONVERTER

Filed Jan. 30, 1961

INVENTOR.
CHARLES W. GEER
BY
ATTORNEY

United States Patent Office 3,263,101
Patented July 26, 1966

3,263,101
PHOTO-CATHODE SOLAR-ENERGY CONVERTER
Charles Willard Geer, Los Angeles, Calif., assignor to Hoffman Electronics Corporation, a corporation of California
Filed Jan. 30, 1961, Ser. No. 85,715
14 Claims. (Cl. 310—4)

The present invention relates to solar-energy converters, and more particularly to photo-cathode solar-energy converters capable of efficient operation in outer space.

Photo-cathode solar-energy converters that are in present use require large anodes in the shape of solid plates that can trap electrons emitted from the cathode. The bigger the anode, the more electrons it can capture, but the larger the shadow that the anode casts upon the cathode. That is, when the anode is made larger, the resulting larger shadow that it casts eliminates any gain in potential. Attempts have been made to make the anode out of meshed screens, which are not opaque to solar energy, but such anode screens do not trap electrons very efficiently.

It is an object of the present invention, therefore, to provide a novel photo-cathode solar-energy converter.

It is another object of the present invention to provide a photo-cathode solar-energy converter having a large area anode that efficiently traps electrons without casting a shadow upon the cathode.

According to the present invention, a solar-energy converter comprises a large-area cathode lying in a plane parallel to that of the incident solar energy. The anode is a large area collector curved so as to reflect incident sunlight towards the cathode while trapping electrons emitted by the cathode.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

Figure 1:
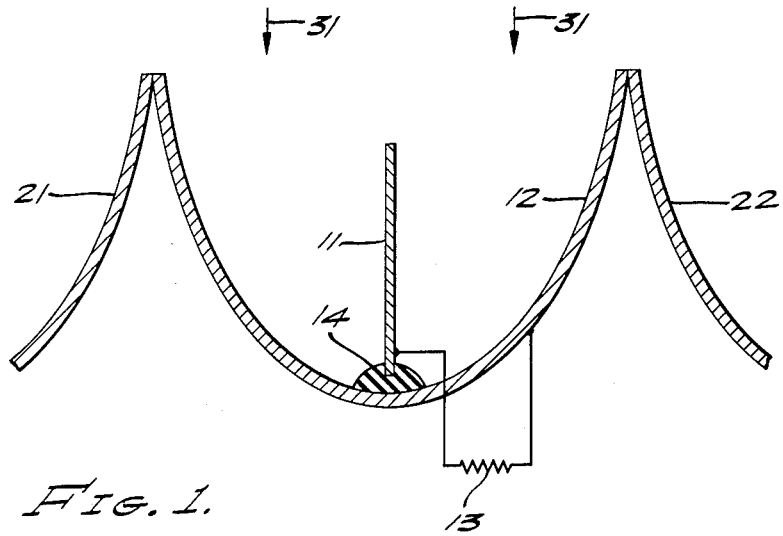
FIGURE 1 is a sectional view of a solar-energy converter in accordance with the present invention.

Referring now to the drawings, FIGURE 1 shows cathode 11 electrically connected to anode 12 through load resistor 13. Anode 12 is trough shaped in cross section. Anode 12 can be parabolic, but need not be, since cathode 11 is planar, and a focal point is not needed. Cathode 11 is positioned perpendicular to the bottom of trough-shaped anode 12 and is electrically isolated therefrom by insulation 14. Anodes 21 and 22 are parts of adjoining solar-energy converters and can be electrically connected to anode 12 either in series or parallel, as desired.

Cathode 11 is a photocathode and can be made of silver coated with an oxide layer on both sides. A layer of a photo-emissive material such as cesium should then be added. Cathode 11 should be a few mils in thickness. Anode 12 can be made of polished aluminum having high reflectivity and a high work function.

Solar energy, represented by arrows 31, incident upon concave anode 12 is reflected onto cathode 11. Since cathode 11 is a photocathode having a low work function, it emits electrons which are captured by anode 12. As can be seen in FIGURE 1, anode 12 casts no shadow upon cathode 11, which lies in the same plane as the incident solar energy. Yet, anode 12 is sufficiently large to act both as an effective solar-energy reflector and as an electron collector.

The described solar-energy converter is designed for use in a vacuum, as is found in outer space. Where the converter is used as a power supply for an earth satellite, the converter will be mounted to the exterior of the satellite and it will be necessary to protect cathode 11 from oxidation while the converter is in the earth's atmosphere prior to launching of the satellite. To this end, cathode 11 can be coated with naphthalene, which will protect the cathode from oxygen until the satellite is sent into outer space. When the satellite reaches outer space, the naphthalene evaporates, exposing the cathode. If the converter is to be used in the earth's atmosphere, cathode 11 can be sealed within anode 12 by a plate glass.

The described solar-energy converter can utilize ultraviolet light, as well as visible light. Ultraviolet-light photons cause the electrons to be emitted from the cathode with about twice as much voltage as does visible light. The described photo-cathode solar-energy converter operates almost as efficiently as photo-voltaic, or solar cells do, since there may be as many as ten electrons emitted for each one hundred photons incident upon cathode 11. The voltage output of the converter shown in FIGURE 1 is approximately 2 volts for the visible light spectrum, which output is approximately five times higher than that of solar cells. Another important advantage over solar cells is that an additional radiator for heat dissipation is not needed.

Figure 2:
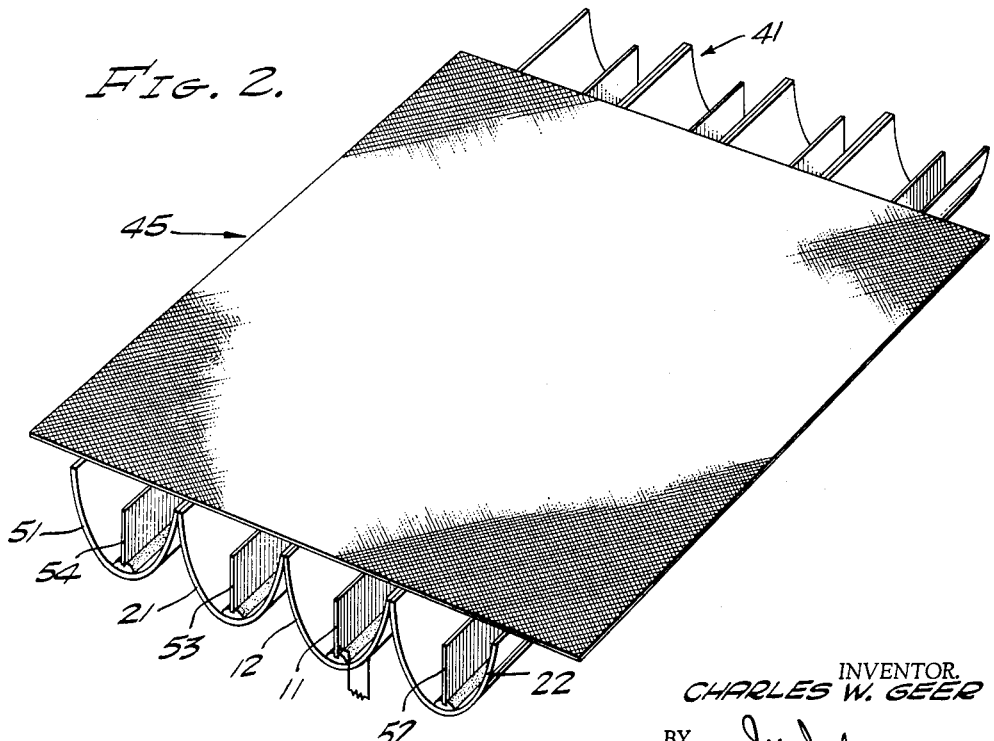
FIGURE 2 is an isometric view of a plurality of solar-energy converters in accordance with the present invention.

FIGURE 2 shows how a plurality of solar-energy converters, each like the one described in FIGURE 1, can be connected together to obtain large-area solar-energy converter 41. Open wire screen cover 45 is provided so that trough-shaped anodes 12, 22, 21, and 51 will capture the maximum number of the electrons that are emitted by planar cathodes 11, 52, 53, and 54, respectively. Each cathode is shown extending the length of its respective trough-shaped anode. Screen cover 45 is electrically connected to the anodes in order to establish a symmetrical field around the cathode, so as to decrease the number of electrons able to leave the system. Since screen cover 45 can be made of any metal wire having a high work function, such as nickel, and is open mesh, it maintains the field gradient within the device at an even level, while allowing the solar energy to pass through. The incident solar energy falls upon the solid metal anodes and is reflected to the cathodes. The device shown in FIGURE 2 does not require a radiator for heat dissipation, in spite of the fact that its efficiency may be as high as 10%, which is almost as high as that of solar cells.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A solar energy converter comprising: a plurality of trough-shaped anodes electrically coupled together; a plurality of planar cathodes, each cathode being positioned perpendicular to the bottom of one of said trough-shaped anodes and extending along the length thereof; and insulation means for preventing said cathodes from being electrically short circuited by said anodes, each of said anodes being curved so as to be able to reflect incident solar energy towards its associated cathode while trapping electrons emitted by said associated cathode.

2. Apparatus as defined in claim 1 in which said converter operates most efficiently when said cathodes lie in a plane parallel to that of said incident solar energy.

3. Apparatus as defined in claim 2 in which each of said anodes is made of a metal having a high reflectivity.

4. Apparatus as defined in claim 3 in which each of said cathodes is coated with an oxide layer and a photoemissive material.

5. Apparatus as defined in claim 4 in which each of said anodes is parabolic in configuration.

6. Apparatus as defined in claim 5 in which said cathodes are adapted for coupling to an external load.

7. Apparatus as defined in claim 6 in which said cathodes are coated with naphthalene.

8. Apparatus as defined in claim 7 including, in addition, a mesh screen suspended above said anodes and electrically connected thereto so as to prevent the development of a field gradient which would cause said electrons to avoid said anodes.

9. A solar-energy converter comprising: a trough-shaped anode; a planar cathode positioned perpendicular to the bottom of said trough-shaped anode and extending along the length thereof; and insulation means for preventing said cathode from being electrically short circuited by said anode, said anode being curved so as to be able to reflect incident solar energy towards said cathode while trapping electrons emitted by said cathode, and said converter operating most efficiently when said cathode lies in a plane parallel to that of said incident solar energy.

10. Apparatus as defined in claim 9 in which said anode is made of a metal having a high reflectivity and said cathode is coated with a photo-emissive material.

11. Apparatus as defined in claim 10 including, in addition, a mesh screen suspended above said anode and electrically connected thereto so as to prevent the development of a field gradient which would cause said electrons to avoid said anode.

12. A radiant energy converter comprising: a trough-shaped anode; and a planar cathode positioned perpendicular to the bottom of said trough-shaped anode and extending along the length thereof, said cathode being electrically insulated from said anode so as to prevent a short circuit therebetween, and said anode being curved so as to be capable of reflecting incident radiant energy towards said cathode while trapping electrons emitted by said cathode.

13. A solar energy converter comprising: a plurality of trough-shaped anodes electrically coupled together; a plurality of planar cathodes, each cathode being positioned perpendicular to the bottom of one of said trough-shaped anodes and extending along the length thereof; insulation means for preventing said cathodes from being electrically short circuited by said anodes, each of said anodes being curved so as to be able to reflect incident solar energy towards its associated cathode while trapping electrons emitted by said associated cathode; and a mesh screen positioned above said anodes and electrically connected thereto so as to prevent the development of a field gradient which would cause said electrons to avoid said anodes.

14. A solar-energy converter comprising: a trough-shaped anode; a planar cathode positioned perpendicular to the bottom of said trough-shaped anode and extending along the length thereof; insulation means for preventing said cathode from being electrically short circuited by said anode, said anode being curved so as to be able to reflect incident solar energy towards said cathode while trapping electrons emitted by said cathode, and said converter operating most efficiently when said cathode lies in a plane parallel to that of said incident solar energy; a mesh screen positioned above said anode and electrically connected thereto so as to prevent the development of a field gradient which would cause said electrons to avoid said anodes.

References Cited by the Examiner

UNITED STATES PATENTS

| 1,934,437 | 11/1933 | Lucas | 313—94 |
| 2,013,095 | 9/1935 | Friend | 313—313 |
| 2,518,048 | 8/1950 | Moore | 313—94 |
| 2,907,318 | 10/1959 | Awot | 126—271 |

OTHER REFERENCES

RCA Technical Notes (Plate Anode for Phototubes), by Engstrom et al., RCA Tn. No. 270, June 1959.

HERMAN KARL SAALBACH, *Primary Examiner.*

ARTHUR GAUSS, *Examiner.*

P. J. SCHLESINGER, S. CHATMON, JR.,
*Assistant Examiners.*